No. 708,231. Patented Sept. 2, 1902.
C. W. HUNT.
VEHICLE.
(Application filed June 14, 1902.)
(No Model.) 2 Sheets—Sheet 1.
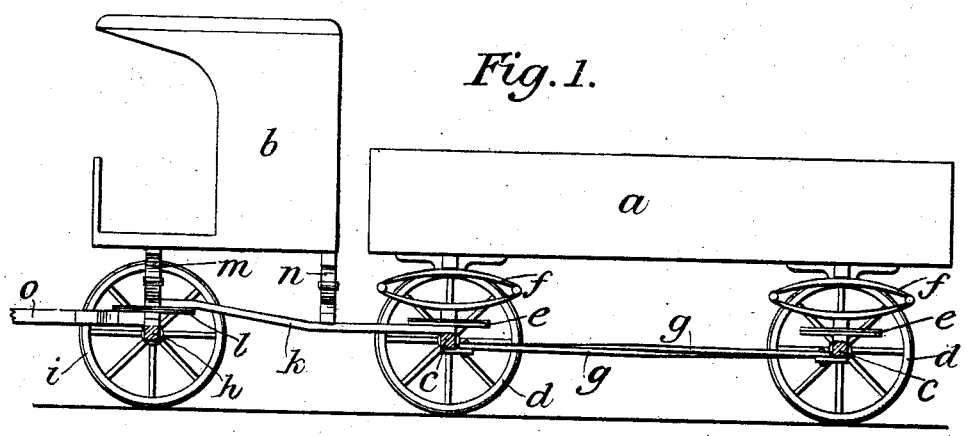
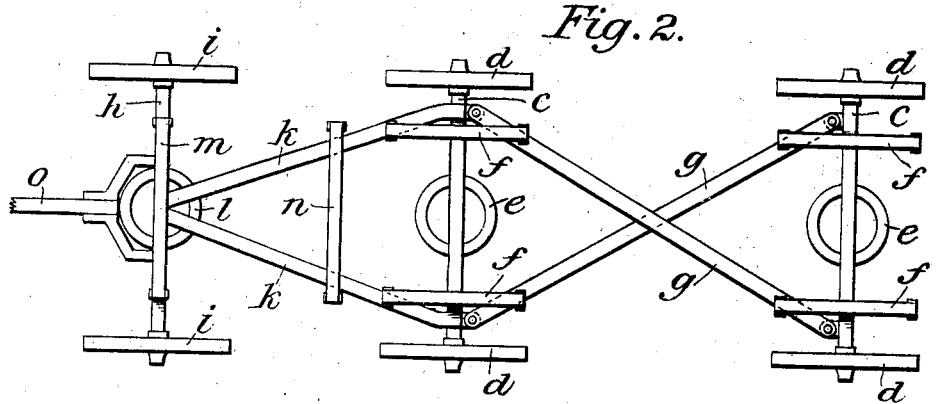
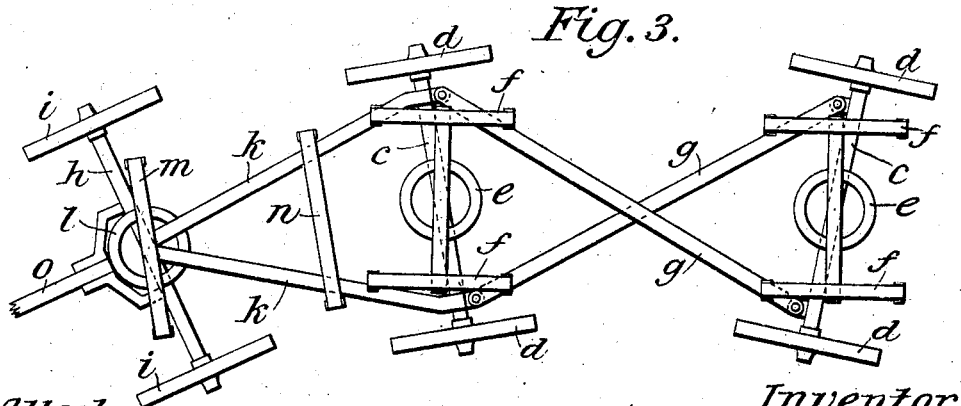
Attest:
A. N. Jesbera
L. E. Varney.
Inventor:
Charles W. Hunt
by Redding Kiddle Greeley
Attys.
THE NORRIS PETERS CO., PHOTO-LITHO., WASHINGTON, D. C.

No. 708,231. Patented Sept. 2, 1902.
C. W. HUNT.
VEHICLE.
(Application filed June 14, 1902.)

(No Model.) 2 Sheets—Sheet 2.

Attest:
A. N. Jesbera
L. E. Varney

Inventor:
Charles W. Hunt
by Redding Kiddle Greeley
Attys.

THE NORRIS PETERS CO., PHOTO-LITHO., WASHINGTON, D. C.

UNITED STATES PATENT OFFICE.

CHARLES W. HUNT, OF WEST NEW BRIGHTON, NEW YORK.

VEHICLE.

SPECIFICATION forming part of Letters Patent No. 708,231, dated September 2, 1902.

Application filed June 14, 1902. Serial No. 111,627. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Vehicles, of which the following is a specification, reference being had to the accompanying drawings, forming a part hereof.

This invention has relation to the steering of vehicles, either horse-drawn or self-propelled, and to the driving of self-propelled or motor vehicles, the improvements being particularly adapted for application to vehicles of a comparatively heavy type, such as are used for commercial purposes.

The object chiefly in view is facility in the handling of heavily-loaded vehicles around curves and to reduce the weight per wheel by using six wheels in a manageable vehicle.

As applied to motor-vehicles the invention has for a further object to permit the steering-wheels to be easily handled, while the driving-wheels are arranged to good advantage with reference to carrying the load and have sufficient grip on the road-surface to drive the load in a satisfactory manner.

The invention will be more fully described hereinafter with reference to the accompanying drawings, in which—

Figure 4:
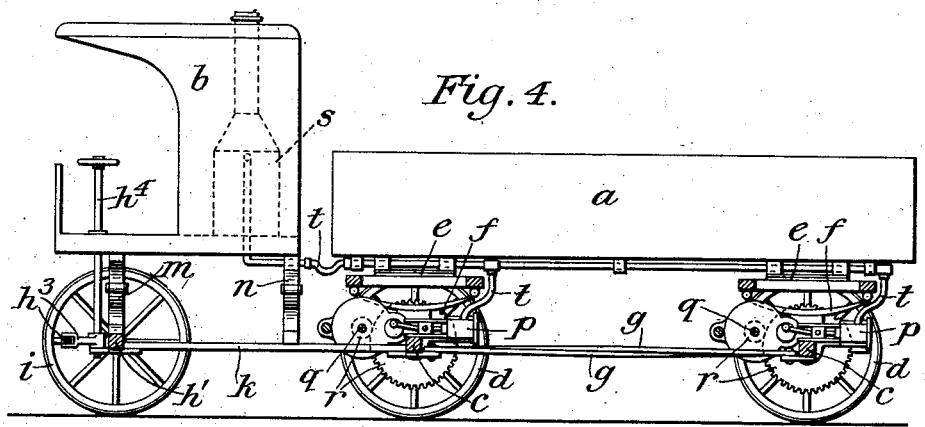
Figure 5:
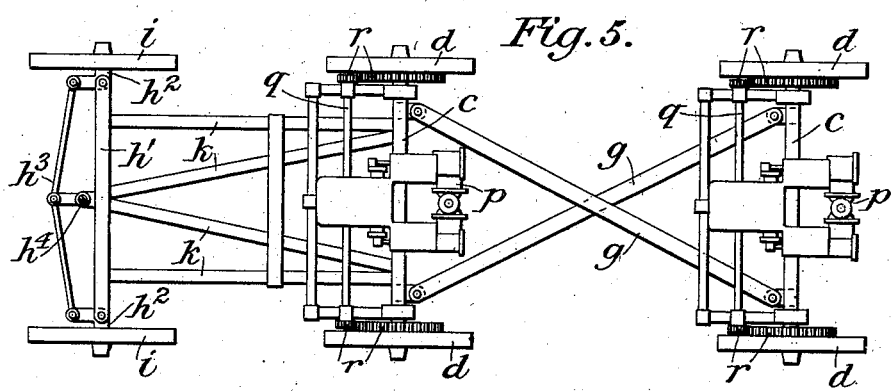
Figure 6:
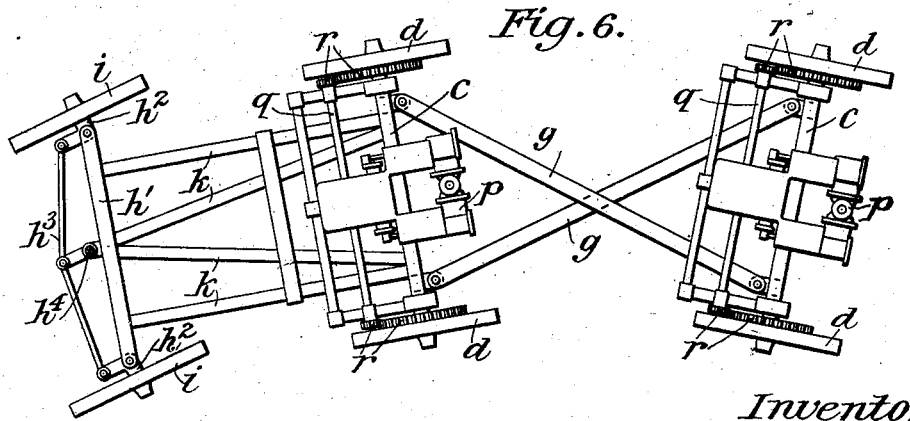

Figure 1 is a view, partly in side elevation, with the axles in section and the rear wheels removed, of a horse-drawn vehicle to which the invention is applied. Fig. 2 is a plan view of the same with the bodies removed. Fig. 3 is a view similar to Fig. 2, but illustrating the relations of the several wheels when the vehicle is turning a corner. Figs. 4, 5, and 6 are views which in general are similar to Figs. 1, 2, and 3, respectively, but showing the application of the invention to a self-propelled or motor vehicle.

In the application of the invention to a horse-drawn vehicle (represented in Figs. 1, 2, and 3) the vehicle has two bodies, one body, $a$, being adapted for the reception of goods to be transported, and the other, $b$, being adapted for the driver of the vehicle. These two bodies are necessarily independent the one of the other, as there is at times relative movement between the two bodies. The body $a$ is supported upon two trucks, each of which, as represented in the drawings, may comprise an axle $c$ and wheels $d$. The body may be supported on these trucks in any convenient manner. As represented, each axle bears a fifth-wheel, as at $e$, upon which the body is conveniently supported, as by springs $f$. The middle and the rear axles $c$ are connected together in such a manner, as by crossed bars or rods $g$, that the oscillation of the middle axle in a horizontal plane produces a corresponding oscillation of the rear axle in the opposite direction, so that the wheels of the rear truck shall follow the wheels of the middle truck when the vehicle is turning a corner or vice versa if the vehicle moves in the opposite direction. The independent body $b$ is supported upon a steering-truck comprising an axle $h$ and wheels $i$, and upon a rigid frame or reach $k$, which connects the steering-truck with the middle truck. As represented in the drawings, the axle $c$ of the middle truck is connected by bars $k$, which constitute the rigid running-frame or reach, and are secured to a fifth-wheel, as at $l$, which rests upon the axle $h$. The body $b$ may be supported upon the axle and rigid running-frame or reach by springs $m$ and $n$ or in any convenient manner. A pole $o$ is represented as connected to the steering-axle $h$, as usual in horse-drawn vehicles. It will be evident that as change of direction is imparted to the vehicle through the steering-truck the rigid running-frame or reach $k$ will incline the middle truck in the corresponding direction as the vehicle moves forward, and through the crossed bars or rods $g$ the rear truck will be oscillated, but in the opposite direction, so that the rear end of the long vehicle will swing around the corner, its wheels following substantially in the tracks of the middle wheels.

The application of the invention to motor-vehicles will be readily understood, but for clearness is illustrated more particularly in Figs. 4, 5, and 6, in which other features of improvements coöperating with those already described are also shown. The relative arrangement of the independent bodies $a$ and $b$, the middle and rear trucks each having an axle $c$ and wheels $d$, the fifth-wheels $e$ and springs $f$, (although in this case the springs are shown below the fifth-wheels and as forming parts of the truck,) the crossed connecting-bars $g$ and the rigid frame or reach $k$ connected to the steering and the middle axles is in all respects substantially the same as already described with respect to Figs. 1, 2, and 3. In this case, however, the steering-truck is represented as having a rigid axle $h'$, at the ends of which are pivoted stud-axles $h^2$ to receive the steering-wheels $i$. The stud-axles are connected, as usual, through suitable linkage $h^3$ with a steering-shaft $h^4$, which projects within the independent body $b$. The relations of the several parts when the vehicle is turning a corner are substantially the same as already described with respect to Figs. 1, 2, and 3, and need not be further explained herein. For the propulsion of the vehicle the motive power is applied to the wheels of the trucks beneath the main weight-carrying body $a$ and is preferably applied to the wheels of both trucks. This secures for the driving-wheels a grip upon the road-surface which is proportionate to the weight of the load, which permits the use of wheels with iron tires, whereby the vehicle is well adapted for heavy work on ordinary roads. Preferably the motor for each truck is itself mounted upon the axle of the truck. Obviously a motor of any desired kind may be employed, but in Figs. 4, 5, and 6 steam-motors $p$ are represented as supported directly upon the axles $c$ and as geared to the driving-wheels through a shaft $q$ and suitable gears $r$. In order that the body $a$ may be available as a whole for the load to be transported, the source of power is conveniently mounted on the independent body $b$. Obviously, if electric motors are employed the source of power will be a storage battery or a generator; but in the present instance, in which steam-motors are shown, the source of power is a steam-generator. (Indicated at $s$ in Fig. 4.) This steam-generator is connected through suitable pipes, which, of course, should be flexible in part, as indicated at $t$ in Fig. 4, with the several motors. Not only does the arrangement of the driving-wheels beneath the main body $a$ secure advantages in the propulsion of the vehicle, but the arrangement of the steering-truck beneath the independent body $b$ is likewise advantageous. Sufficient weight thus rests upon the steering-wheels to enable them to perform their function properly without requiring undue power to operate them, and the weight thereon remains substantially the same, so that the driver is not influenced by changes of the load carried on the body $a$.

It will be obvious that various changes in the construction and arrangement of the several parts of the improved vehicle may be made without departing from the spirit of the invention, which is not restricted to the particular construction and arrangement shown and described herein.

I claim as my invention—

1. A vehicle comprising a middle and a rear truck, cross connections between said trucks, a forward steering-truck, and a rigid frame or reach connecting said steering-truck with the middle truck, substantially as described.

2. A vehicle comprising a middle and a rear truck, cross connections between said trucks, a forward steering-truck, a rigid frame or reach connecting said steering-truck with the middle truck, and a motor applied to the wheels of one of said trucks, substantially as described.

3. A vehicle comprising a middle and a rear truck, cross connections between said trucks, a forward steering-truck, a rigid frame or reach connecting said steering-truck with the middle truck, and a motor mounted on the axle of one of said trucks and applied to the wheels of said truck, substantially as described.

4. A vehicle comprising a middle and a rear truck, cross connections between said trucks, a body mounted on said trucks, a forward steering-truck, a rigid frame or reach connecting said steering-truck with the middle truck, and an independent body mounted on the steering-truck and reach, substantially as described.

5. A vehicle comprising a middle and a rear truck, cross connections between said trucks, a body mounted on said trucks, a forward steering-truck, a rigid frame or reach connecting said steering-truck with the middle truck, an independent body mounted on the steering-truck and reach, a motor applied to the wheels of the middle or rear truck, and a source of power mounted on said independent body, substantially as described.

This specification signed and witnessed this 12th day of June, A. D. 1902.

CHARLES W. HUNT.

In presence of—
ANTHONY N. JESBERA,
M. A. BRAYLEY.